(12) United States Patent
Lanphear et al.

(10) Patent No.: US 9,053,160 B2
(45) Date of Patent: Jun. 9, 2015

(54) DISTRIBUTED, REAL-TIME ONLINE ANALYTICAL PROCESSING (OLAP)

(71) Applicant: HERE GLOBAL B.V., Veldhoven (NL)

(72) Inventors: Damon Lanphear, Seattle, WA (US); Prabuddha Biswas, Seattle, WA (US)

(73) Assignee: HERE GLOBAL B.V., Veldhoven (NL)

( * ) Notice: Subject to any disclaimer, the term of this patent is extended or adjusted under 35 U.S.C. 154(b) by 175 days.

(21) Appl. No.: 13/928,299

(22) Filed: Jun. 26, 2013

(65) Prior Publication Data

US 2014/0101093 A1    Apr. 10, 2014

Related U.S. Application Data

(60) Provisional application No. 61/664,734, filed on Jun. 26, 2012.

(51) Int. Cl.
*G06F 17/30* (2006.01)

(52) U.S. Cl.
CPC .............................. *G06F 17/30563* (2013.01)

(58) Field of Classification Search
USPC .................................. 707/600, 602, 802, 796
See application file for complete search history.

(56) References Cited

U.S. PATENT DOCUMENTS 8,234,240 B2 *   7/2012   Myerson et al. ............... 707/603
8,909,678 B2 * 12/2014   Williamson ................... 707/802

(Continued)

FOREIGN PATENT DOCUMENTS

JP   2007-502466 A   2/2007
KR   20090059656 A   6/2009

OTHER PUBLICATIONS

International Search Report and Written Opinion dated Oct. 10, 2013 for International Application No. PCT/US2013/048006, 9 pages.

(Continued)

*Primary Examiner* — Hung T Vy
(74) *Attorney, Agent, or Firm* — Ditthavong & Steiner, P.C.

(57) ABSTRACT

Source data of an event stream is parsed and supplemented with additional data from reference data sources, producing an enriched event stream from the parsed event stream data. The data records of the enriched event stream are partitioned into data fields designated as a dimension partition and a metric partition, which are partitioned into sub-dimension projections mapped to a plurality of storage keys, such that each of the storage keys includes one or more placeholder wildcard values and each of the storage keys is stored into a database of the computer system by the computer processor. The stored storage keys are then aggregated onto a two-dimensional coordinate vector such that, if the computer processor identifies a permuted storage key having metric values for which a corresponding storage key already exists in the database, then the computer processor aggregates the metric values of the identified storage key with the metric values of the corresponding storage key, and if the computer processor does not identify the permuted storage key as having a corresponding storage key that already exists in the database, then the computer processor writes the metric values of the permuted storage key into the database, comprising initial values for the key combination of dimension values.

6 Claims, 6 Drawing Sheets

(56) References Cited

U.S. PATENT DOCUMENTS

| | | |
|---|---|---|
| 2010/0198777 A1* | 8/2010 | Lo et al. .................. 707/601 |
| 2010/0250412 A1 | 9/2010 | Wagner |
| 2011/0125668 A1 | 5/2011 | Colliat et al. |
| 2011/0161282 A1 | 6/2011 | Williamson |
| 2011/0208690 A1 | 8/2011 | Cushing et al. |
| 2013/0238549 A1* | 9/2013 | Aski et al. .................. 707/602 |

OTHER PUBLICATIONS

Notification Concerning Transmittal of International Preliminary Report on Patentability (Chapter I of the Patent Cooperation Treaty); International Preliminary Report on Patentability; Written Opinion of the International Searching Authority for corresponding International Application No. PCT/US2013/048006, dated Jan. 8, 2015, 6 pages.

* cited by examiner

DISTRIBUTED, REAL-TIME ONLINE ANALYTICAL PROCESSING (OLAP)

CROSS-REFERENCE TO RELATED APPLICATIONS

This application claims priority of U.S. Provisional Patent Application Ser. No. 61/664,734 entitled "DISTRIBUTED, REAL-TIME Online Analytical Processing (OLAP)" by Damon Lanphear and Prabuddha Biswas, filed Jun. 26, 2012. Priority of the filing date of Jun. 26, 2012 is hereby claimed, and the disclosure of the Provisional Patent Application is hereby incorporated by reference

BACKGROUND

Online Analytical Processing (OLAP) is a set of techniques for organizing source data to support rapid responses to complex, multi-dimensional queries of the source data. OLAP techniques are commonly applied to business intelligence and marketing problems in which it is desired to investigate how customers behave according to demographic, psychographic, or other attributes. Other applications of OLAP involve relational reporting and data mining. The output of an OLAP query is typically provided as a table having rows and columns comprising "dimensions" and values of the table cells comprising "measures". The dimensions may be categorized by searchable terms such as sales, date, clerk, customer name, and the like. The measures comprise data values that correspond to the intersection of particular combinations of the dimensions. For example, a query might request date=May 1st, 2011 and clerk=John Smith. The measures would correspond to all data records where the sales date is May 1st and the clerk name is John Smith.

The set of all possible combinations of the source data dimensions contain the set of responses to all possible queries submitted to the OLAP system. To ensure timely response to OLAP queries, and because of the large number of possible queries that could be submitted, many OLAP systems calculate a predetermined number of the possible OLAP queries. If a query is submitted that matches a pre-calculated response, then the response table can be provided immediately. Typically, queries that are most likely to be received are the subject of pre-calculation. Responses to other queries must be solved on demand, upon receipt.

Efficient processing for responding to queries involves selecting which dimension combinations, or views, are most likely to be requested from users in a query, and pre-calculating responses for rapid query response. Other techniques for OLAP involve combining use of relational tables and specialized storage for improved response. It is known to provide what is called "real-time OLAP", in which the OLAP database (commonly called the "cube") is stored in RAM, so that responses to OLAP queries can be calculated on the data stored in RAM and returned in real-time. In this type of OLAP, the size of the OLAP data for searching can be no larger than the size of RAM on the computer machine that hosts the OLAP application.

Several approaches to implementing OLAP exist today and have been in the commercial marketplace for over a decade. As apparent from the discussion above, the existing approaches generally suffer from fundamental limitations on the amount of data that can be searched, the number of dimensions in the database, cardinality of the dimensions, and ability to be updated in real-time as new data become available. These limitations render the existing approaches impractical for new classes of OLAP applications that include live dashboards on customer activity and predictive analytical features.

SUMMARY

In accordance with the present invention, source data of an event stream is parsed and supplemented with additional data from reference data sources, producing an enriched event stream from the parsed event stream data. The data records of the enriched event stream are partitioned into data fields designated as a dimension partition and a metric partition. The dimension partition and the metric partition are partitioned into sub-dimension projections that are mapped to a plurality of storage keys, such that each of the storage keys includes one or more placeholder wildcard values and each of the storage keys is stored into a database of the computer system by the computer processor. The stored storage keys are then aggregated onto a two-dimensional coordinate vector such that, if the computer processor identifies a permuted storage key having metric values for which a corresponding storage key already exists in the database, then the computer processor aggregates the metric values of the identified storage key with the metric values of the corresponding storage key, and if the computer processor does not identify the permuted storage key as having a corresponding storage key that already exists in the database, then the computer processor writes the metric values of the permuted storage key into the database, comprising initial values for the key combination of dimension values. The resulting database increases the efficiency of operations such that the system experiences an increase in the amount of data that can be quickly searched, the number of data dimensions that can be processed in the database, the cardinality of the dimensions, and the ability to be updated in real-time as new data become available.

In another aspect, as disclosed herein, a distributed, persistent data store is provided that is structured as an associative array. The associative array may span a number of computer hosts, and new computer hosts can be added to the array at any time to expand its capacity. The distributed associative array may include a two-level caching mechanism by which data are stored first on a persistent medium of a host computer and secondarily cached in volatile memory of the host computer for fast access. The distributed associative array supports atomic updates to its contents, providing guarantees on the coherency of the data in the presence of concurrent updates. This construction provides a system with theoretically unlimited scalability in the size of the source data, number of dimensions, and the cardinality of the dimensions. Further, queries and updates to the OLAP system can be processed in an amount of time that is sufficiently rapid to be useful for interactive applications.

Other features and advantages of the present invention will be apparent from the following description of the embodiments, which illustrate, by way of example, the principles of the invention.

Additional details are provided by the attached appendices, which are incorporated herein.

DETAILED DESCRIPTION

Figure 1A:
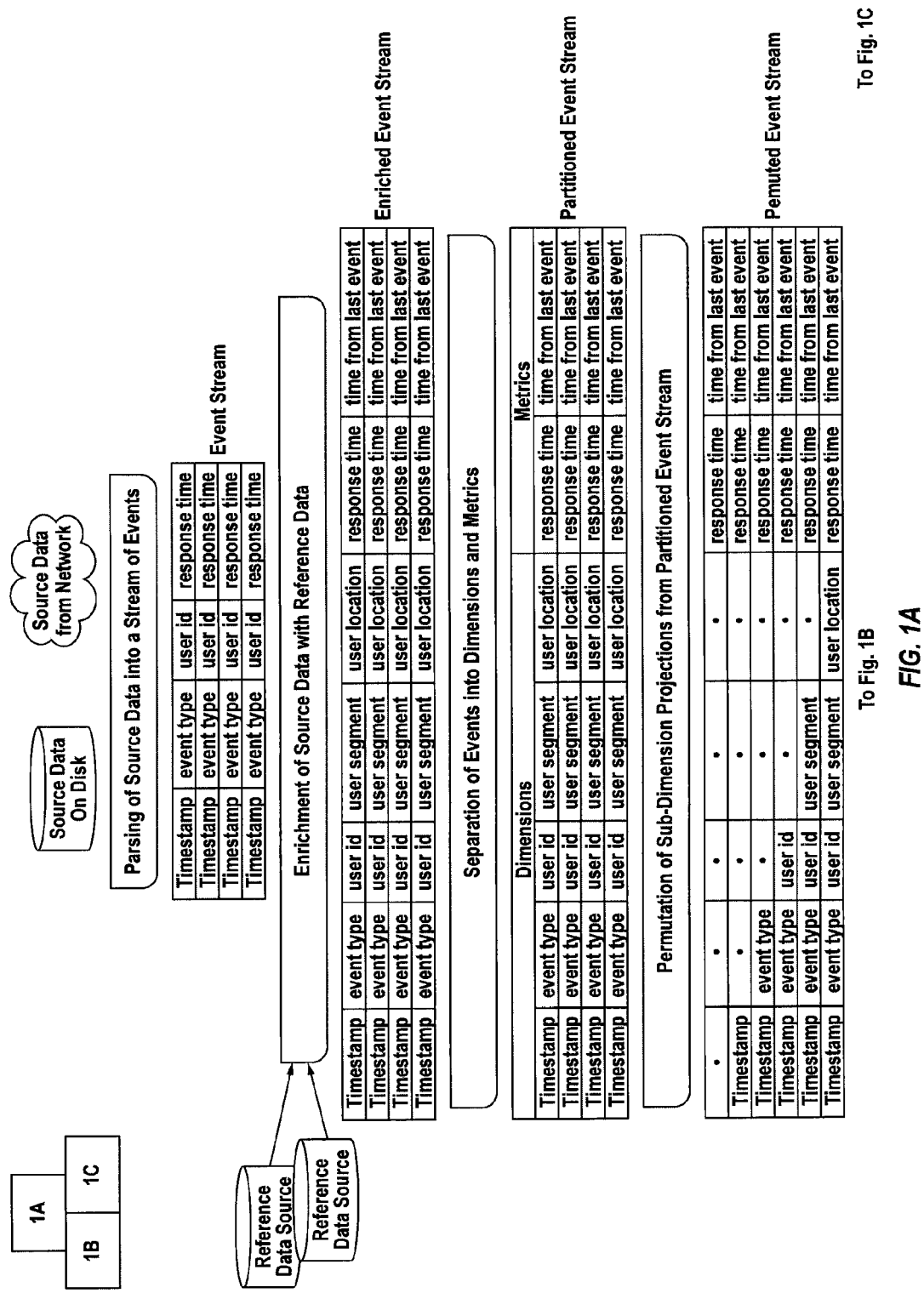
FIG. 1A, FIG. 1B, and FIG. 1C comprise a process flow diagram that illustrates data operations in a system constructed in accordance with the invention.
Figure 1B:
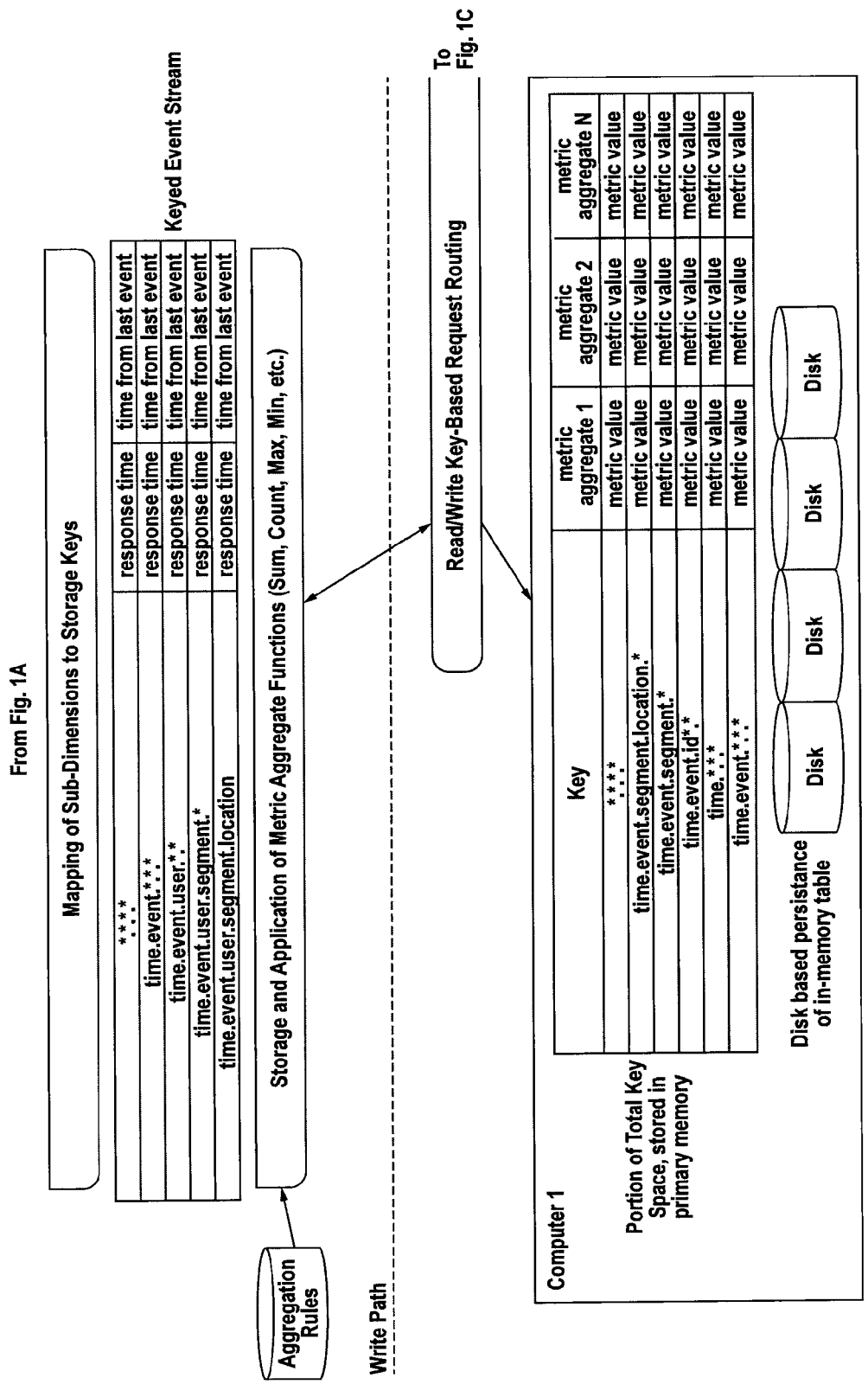
Figure 1C:
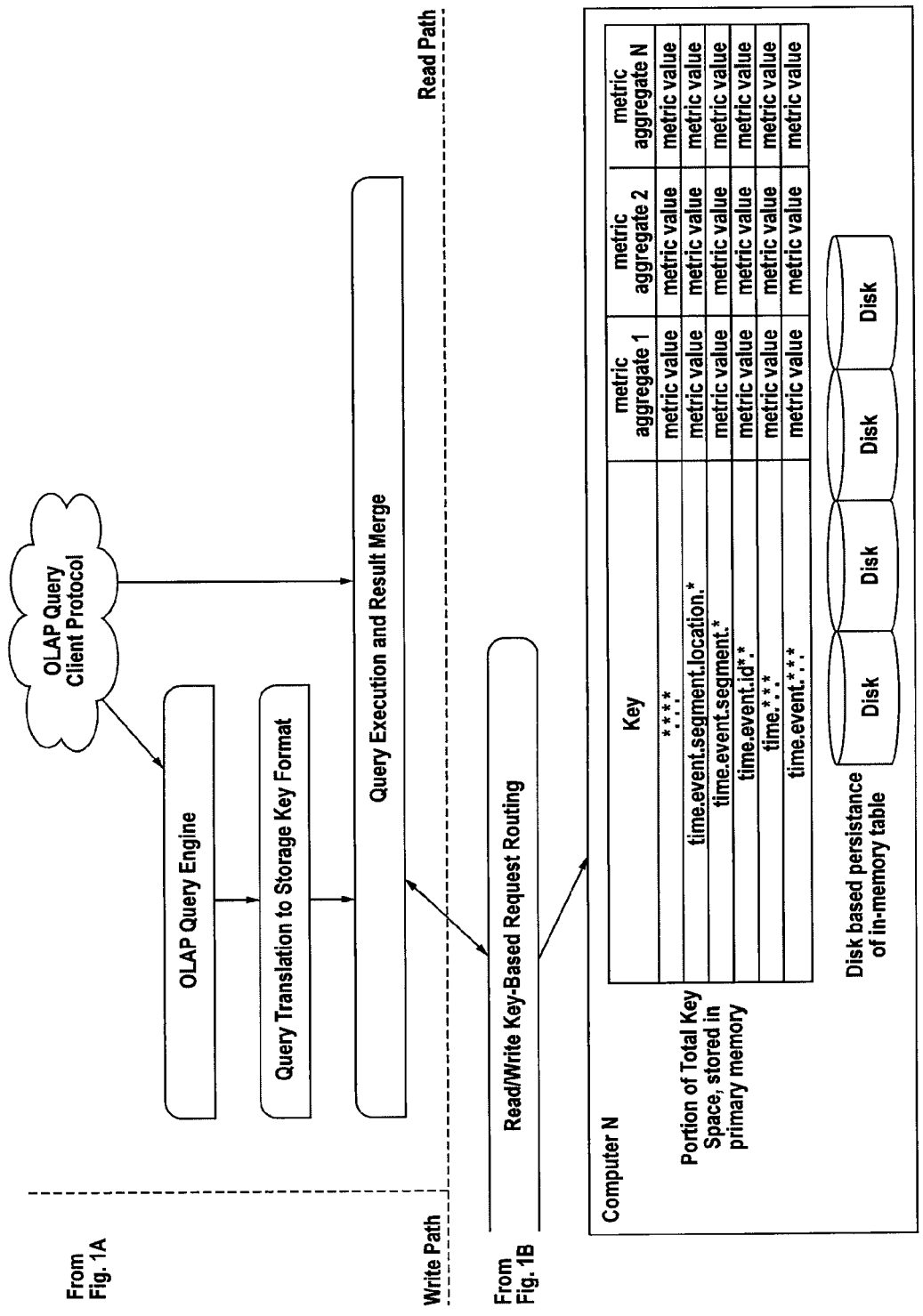

FIG. 1A, FIG. 1B, and FIG. 1C are three drawing sheets that illustrate the process flow that takes place in a system constructed in accordance with the invention. FIG. 1A, FIG. 1B, and FIG. 1C will be referred to collectively herein as "FIG. 1", which reference should be understood as a reference to the three drawing sheets FIG. 1A, FIG. 1B, and FIG. 1C taken together, as comprising a single drawing, or when discussing an element in a single one of the three drawing sheets FIG. 1A, FIG. 1B, and FIG. 1C, the reference to "FIG. 1" may be a reference to the single one of the three drawing sheets, as appropriate according to context. FIG. 1 illustrates aspects of the system, including a write path, a read path, and a request routing operation for request routing between the read and write paths. More particularly, the write path of FIG. 1 shows that source data is available from storage that is local to an OLAP host system, or over a network, in a write path that populates an OLAP database of the system (the write path that begins in the upper left corner of FIG. 1). In the read path, starting in the upper right corner of FIG. 1, a data query message is received at the system, as indicated by the network cloud at the top right corner of FIG. 1. The query is received and processed by the OLAP Query Engine of the system, and then is processed into the proper format and then the query is applied from the read path to the system database at the bottom of FIG. 1. The results of the query are returned to a results merge operation in accordance with request routing, back up through the read path for return to the query initiator at the upper right of the read path in FIG. 1.

The write path of FIG. 1 shows that the source data is parsed into a stream of events, such as sales events or service calls, using appropriate dimensions of interest to system users. For example, in FIG. 1, each source event is indicated as a 4-tuple, comprising a data record that includes a time stamp value, an event type indicator, a user ID, and a response time. Such data records might be produced by a system that keeps track of service calls or product complaints. In such a system, the "event type indicator" value could be used to distinguish between service calls, repair requests, product complaints, and the like. In a point-of-sales system, the source data records would more likely data relating to sales by persons for which the data includes items and pricing. Parsing such data into an event stream would produce tuples that are combinations of, for example, a time stamp, sales person ID, price, and number of items sold. For purposes of illustration, a sample 4-tuple value from an event stream comprising point-of-sales events might be given by the following:

Event Stream:
[TimeStamp, SalesPersonID, Price, Items]
[2012-01-19T13:34:00-0800, 11923245, $2352, 40].

In the sample Event Stream 4-tuple data record listed immediately above, the time stamp value may be read as year=2012, month=01, day=19, and time=13:34:00-0800, wherein time is given in a 24-hour format relative to Greenwich mean time. Other formats may be used without departing from the teachings of the invention.

The next operation produces an enriched event stream from the parsed event stream data. In this operation, reference data sources may be consulted for adding additional data of interest to each parsed event stream data, according to additional parameters that may be of interest and that may be accessed via the OLAP query system. For example, a sales person may have a particular store location that may be determined from a reference data source for adding to the event stream data. Such additional data is illustrated in FIG. 1 as comprising data relating to user segment data, user location data, and time-from-last-event data. Thus, the 4-tuple of the parsed event stream data is converted to the 7-tuple illustrated in FIG. 1. In another embodiment, continuing with the example of an event stream comprising point-of-sales events, an exemplary enriched event stream data record might be given by the following:

Enriched Event Stream:
[TimeStamp, SalesPerson, Location, Price, Items]
[2012-01-19T13:34:00-0800, John, Seattle, $2352, 40]

In the sample Enriched Event Stream 7-tuple data record listed immediately above, the event stream data record is enriched by substitution of the sales person ID ("11923245") by a SalesPerson name data value ("John") and by the addition of a sales location ("Seattle"). Thus, the event stream data is enriched with reference data that provides additional data of importance to the system user. The reference data may comprise, for example, data about the entity that created the corresponding source data, such as the user geographic location or demographic (segment) information regarding the customer whose action generated the source data.

Next in the write path, the incoming data is partitioned into events according to dimensions and measures, referred to as metrics. The metrics generally relate to factual data points such as time elapsed, monetary amounts, street addresses, client age, and the like. The dimensions generally relate to attributes that identify the incoming data records, such as timestamp for time of creation, user demographic group, transaction type, and the like. FIG. 1 shows that the data records of the enriched event stream are partitioned into data fields designated as dimensions and data fields designated as metrics. In FIG. 1, the dimension fields include timestamp, event type, user ID, user segment, and user location, whereas the metric fields include response time and time from last event. In another embodiment, continuing with the example of an event stream comprising point-of-sales events, an exemplary partitioned event stream data record might be given by the following:

Partitioned Event Stream:
[Dimensions: Year, Month, Day, SalesPerson, Location|Metrics: Price, Items]
[2012, 01, 19, John, Seattle, 2352, 40]

In the sample Partitioned Event Stream data record immediately above, the data field schema is given by the 5-tuple comprising dimensions of <Year>-<Month>-<Day>-<SalesPerson>-<Location>, and the metrics of interest comprise the 2-tuple of metrics <sum(Price)>-<sum(Items)>. Thus, the timestamp value is converted to more meaningful year-month-day values. Other data conversions and transformations may be utilized, as desired for the OLAP query system.

The partitioned event stream is then permuted into sub-dimension projections, as will be known to those skilled in the art. The permuted sub-dimension projections are then mapped to storage keys, again, as will be known to those skilled in the art. For example, the permutation of dimensions may be performed by a processing function that generates a permutation of dimensions and a wildcard placeholder to represent an "ANY" value for a dimension. The ANY value is an aggregation of all metrics that match a particular dimension. The system can utilize the permutations, for example, to enable a user to ask for "total value for all sales in Seattle for all time," or to ask for "all sales for the month of July made by salesperson John." As known to those skilled in the art, such permutation processing will permute all combinations of possible ordered subsets that will allow lookups by any key combinations of the dimensions and metrics.

With respect to the permutation processing, and continuing with the example of an event stream comprising point-of-sales events, an exemplary list of permutations of the 7-tuple partitioned event stream records with dimensions and metrics might be given by the following:

Permuted Keyed Event Stream:
[Year.Month.Day.Location.SalesPerson, Price, Quantity]

[*.*.*.*.*, 2352, 40],
[2012.*.*.*.*, 2352, 40],
[2012.01.*.*.*, 2352, 40],
[2012.01.19.*.*, 2352, 40],
[2012.01.19.Seattle.*, 2352, 40],
[2012.01.19.Seattle.John, 2352, 40],
[*.01.19.Seattle.John, 2352, 40],
[2012.*.19.Seattle.John, 2352, 40],
[2012.01.*.Seattle.John, 2352, 40],
[2012.01.19.*.John, 2352, 40], . . . and so forth for the remaining permutations, as will be known to those skilled in the art. Each of these permuted data records comprises a key for a mapping of the partitioned event stream data to the collection of permuted event stream data. As each permuted data record is generated, it is stored in a system database. Each permuted data record comprises a data cell of an OLAP cube.

As the permuted data records are generated and stored, the system processing in the write path uses aggregation rules to apply aggregate functions to the incoming data. The aggregate functions map the cube data cells onto a two-dimensional coordinate vector. During aggregation, if a key (i.e., permuted data record) already exists in the database, then the metric values of the data record are aggregated with the existing values in the database according to the aggregation function. If the key does not already exist, then the metrics are written into the database as the initial values for that key combination of dimension values. This technique for storage and processing of event stream data allows efficient OLAP analysis on the data fields as desired. For example, continuing with the example of an event stream comprising point-of-sales events, the OLAP analysis system as disclosed herein supports query processing that can retrieve data records that satisfy a query asking for total items sold and total revenue received by all combinations of year, month, day, location, and sales person.

The storing of the permuted data records and the aggregating according to identified already existing metric values for mapping onto a two-dimensional coordinate vector provides a distributed, persistent data store that may be structured as an associative array. Those skilled in the art will understand that conventional OLAP cubes typically have three or more data dimensions, over which database processing and query processing must be provided. The mapping of n-tuple permuted data records onto a two-dimensional coordinate vector as disclosed herein increases efficiency by decreasing the dimensions of the OLAP cube over which processing must be provided.

The associative array may be stored in the database of the system and can span across a number of computer hosts. Moreover, new computer hosts can be added to the associative array at any time to expand its capacity. In this way, the associative array can be distributed across multiple computer hosts. Thus, the distributed associative array can be provided with a two-level caching mechanism, by which data are stored first on the persistent medium of the host computer and secondarily cached in volatile memory for fast access. The distributed associative array supports atomic updates to its contents, providing guarantees on the coherency of the data in the presence of concurrent updates.

The query technique that is used for the system can comprise a wide variety of techniques. For example, there may be many query front ends that are designed to interface with difference systems. Such systems are suitable for use with the disclosed system. In general, the fundamental concept of satisfying a query requires that the query language must be translated to the internal vector representation used by the analysis system. In some cases, the keys may be accessed directly, and in other cases an intermediary language such as "MDX" may be utilized to access the keys (permuted data records).

The "Computer 1" and "Computer N" blocks at the bottom of FIG. 1 indicate the computers that store the OLAP cube data. That is, FIG. 1 indicates that one or more computers will receive incoming data processed according to the write path, and can be used to respond to OLAP queries from one or more clients in the read path. The collection of persistent data storage at each of the computer blocks in FIG. 1 represents a collection of computer hosts that provide an associative array that are distributed across the computer blocks Computer 1, . . . , Computer N. The collection of computer hosts may be managed, for example, by one of the host computers that is designated a managing host computer. Alternatively, the collection of computer hosts may distribute incoming event stream data for processing according to predetermined techniques for appropriate load balancing. New computer hosts can be added to the associative array at any time to expand its capacity.

The distributed associative array may include a two-level caching mechanism by which data are stored first on the persistent medium of one or more of the host computers and secondarily cached in volatile memory of the host computers for fast access. The two-level caching is achieved by first storing the data in a distributed file system. The distributed file system keeps three copies of the data for redundancy. The system then assigns a portion of the total key-space to each host computer, which acts as a server of the database, such that each search has 1/N of the total key space, where N is the number of host computer servers. The assignment of key-space across the host computers of the system may be achieved under management of a designated managing host computer or the host computers may operate according to a predetermined collaborative assignment scheme. The key assignment is based on a lexicographic sorting of the keys and 1/N of that key space is assigned at random to each of the servers. The servers will then cache their portion of the key space in memory. The distributed associative array supports atomic updates to its contents, providing guarantees on the coherency of the data in the presence of concurrent updates.

Each of the host computers Computer 1, . . . , Computer N includes a network communications block adapted for communications with a computer network, such as the Internet or a local area network of host computers, and also includes a computer processor and associated memory for use by the computer processor. Those skilled in the art will understand additional physical components that may be necessary for, or may improve the processing of, the host computers.

In the read path, starting in the upper right corner of FIG. 1, a data query message is received in accordance with an OLAP query client protocol, as indicated by the network cloud at the top right corner of FIG. 1. The query is received and processed by the OLAP Query Engine of the system, and then is processed (or translated) to include the appropriate storage key information according to the sub-dimension mapping referenced above in the write path. The query is then applied to the database, such that the query may be provided to the distributed computers of the OLAP system, comprising system computers Computer 1, Computer 2, and so forth to Computer N, as illustrated in FIG. 1. The results of the query are returned to a results merge operation in accordance with request routing, so that results from each of the system computers is merged in the Query Execution and Result Merge block, to be returned to the querying client at the upper right of the read path in FIG. 1.

The operation of the write path and read path of the OLAP system described herein will be better understood with accordance with the following description of the OLAP system.

OLAP data is commonly referred to as a cube, where each dimension of the cube corresponds to an attribute of the source data. For example, a customer's location at the time of purchase can be regarded as a dimension. Another dimension may correspond to the purchased item, another dimension may correspond to the user's demographic attributes, and so forth. The OLAP data is represented in the associative array as a two-dimensional projection of a N-dimensional cube. The cube is projected into two-dimensions by composing a coordinate vector of a data point in the cube and applying this vector as a key in the associative array. Each array key is associated with a value, which is a value of the data point. The data point value corresponds to one or more metrics for the given cube coordinate. For example, the data point value may be the number of purchases, and the dimensions may comprise the geographic location, demographic segment, and time of day. Thus, if the coordinate vector comprising the two-dimensional projection is represented as {a, b}, then the two dimensions of the example coordinate vector correspond to a=[number of purchases] and b=[geographic location, demographic segment, time of day] where b is a 3-tuple.

Another example of the data organization comprising an associative array represented as a two-dimensional projection of a N-dimensional cube is illustrated as follows. Taking sales data for ringtones as the example, suppose that the data is formatted as a 5-tuple comprising {timestamp, userid, geographic location, ringtoneid, sale-amount}. An example of a data record with actual values for the five items of the 5-tuple might be: {2011-03-30T23:13:23, X1EhipHMjNP5ZQ, Seattle, 4a62b1170c77, $0.99}.

If we assume, for the example, that the OLAP cube according to the invention includes data (i.e., metrics) for Total Sales Amount and Number of Sales, then the system receives data records corresponding to the 5-tuple above and aggregates the data according to the database aggregation rules. That is, metrics for the OLAP cube will include Total Sales Amount and Number of Sales. Since the data records include date information and geographic location information, the dimensions on which we may query include Month and Location. The system described herein will permute each dimension so all combinations of dimensions are included and can be specified by a wildcard value, represented by "*", meaning that any value for the dimension may be searched. Each dimension is represented as a tuple of the dimension values, for example, the permutations of dimension values month and location are represented in the table below:

| *.* |
| --- |
| March.* |
| *.Seattle |
| March.Seattle |

The aggregated metrics then provide one or more columns for each dimension, corresponding to the aggregated metrics. For example, for the OLAP metrics of total Sales Amount and Number of Sales, the following table is provided in the database, where for each dimension representation (comprising four rows for aggregate of all months and locations, month=March, location=Seattle, and both month=March and location=Seattle) there are one or more columns corresponding to the aggregated metrics, with Total Sales in the second column, and Number of Sales in the third column:

| *.* | $126863.55 | 128145 |
| --- | --- | --- |
| March.* | $1450.00 | 1525 |
| *.Seattle | $65159.00 | 67145 |
| March.Seattle | $531 | 615 |

In the example above, the data includes two dimensions, comprising rows and columns. The rows associate the aggregate values with a permutation of the key space, and the columns represent the values of aggregates for the given key. Thus, the key space may be regarded as an N-dimensional matrix where each dimension corresponds to a dimension of the data. In this example, from the table above, those dimensions would be Time and Place. For the purpose of discussion, imagine that time is the x-axis, and place is the y-axis. The aggregate value would be determined by first finding time on the x-axis and then going down the y-axis to find the place. The aggregates at that point on the space would be the value queried by the user. In this example, again, those "coordinates" have been "flattened" into a composite key. The key may be regarded as an (X,Y) coordinate of arbitrary dimension. That is, it could be a 4-dimensional coordinate in (W, X, Y, Z) space. Rather than maintain a 4-dimensional cube, a composite key and data store are constructed that are the keys to aggregating data for each point in the space.

A distributed processing environment is used in the OLAP system described herein to perform bulk updates to the OLAP cube data as new data arrive at the system. The distributed processing environment allows the cube to be updated in parallel by many computer hosts, thereby radically decreasing the time required to integrate new data into the OLAP system. Further, the system may be similarly updated in real-time, as new data become available they are processed into their two-dimensional projections and inserted in the distributed storage mechanism.

The system is queried using either a specialized query language that is provided with the system or may be provided through adapters to industry standard query languages for OLAP, including query languages such as XMLA. The queries are processed through a scalable tier of Web-based (HTTP) servers running on computer hosts that are separate from the distributed storage system.

The distributed processing environment and the distributed storage environment are likewise partitioned into their own tiers. Each tier corresponds to both a class of computer hosts that have been tuned to optimally execute their tasks, and to provide security control by separating the source data, which is not accessible from external systems, from the OLAP data that may be accessed by external systems or over the Internet.

Figure 2:
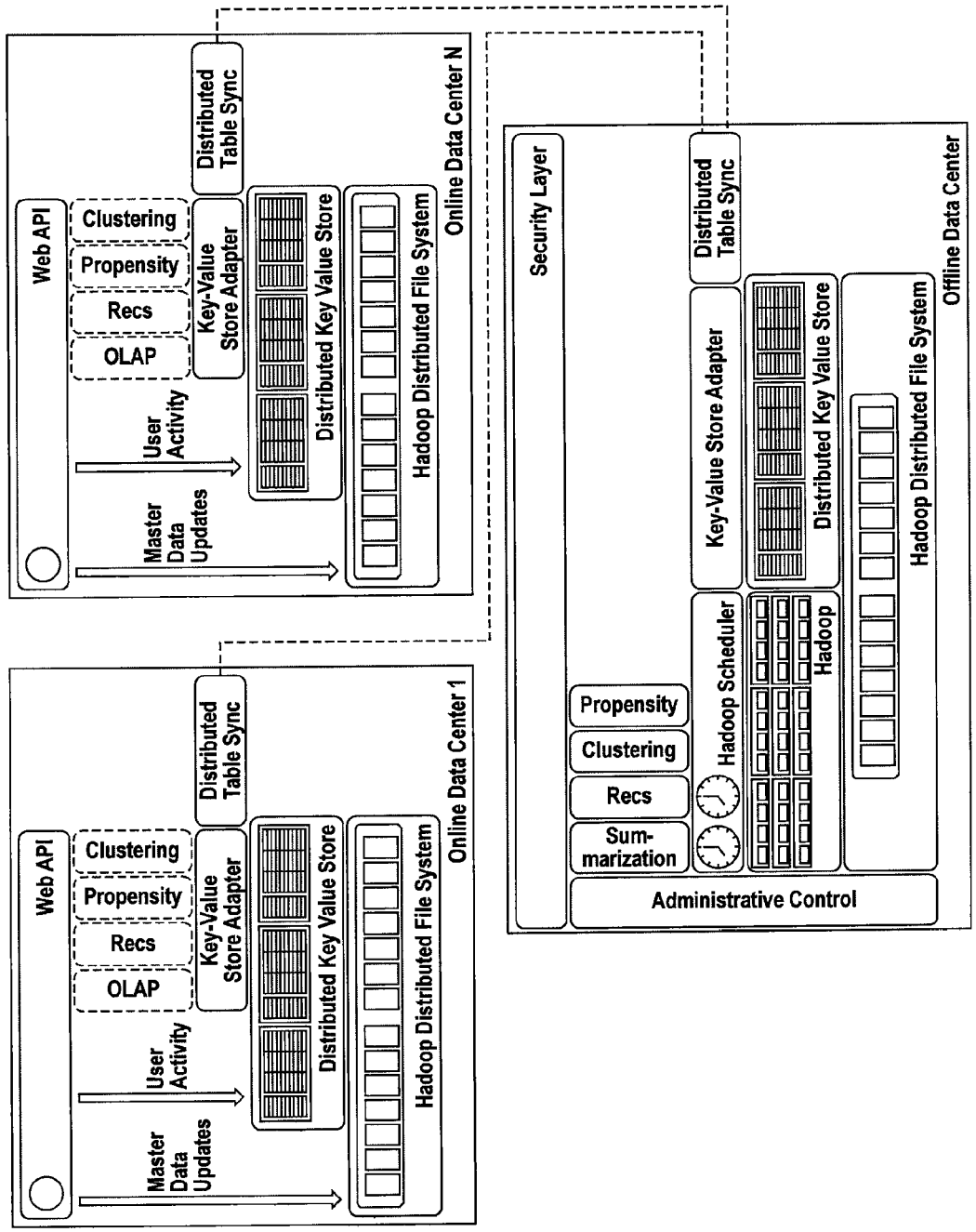
FIG. 2 is a block diagram of the system topology for the system illustrated in FIG. 1.

FIG. 2 is a topology overview of the system computers and data stores of the OLAP system. For example, the "Online Data Center 1" of FIG. 2 corresponds to the "Computer 1" of FIG. 1, and the "Online Data Center N" of FIG. 2 corresponds to the Computer N of FIG. 1. The "Offline Data Center" illustrated in FIG. 2 is a datastore that communicates with the online computers and acts as a data depository to contain large databases for use by the online computers. The Offline Data Center integrates new or existing data in a batch processing mode. The batch processing of the Offline Data Center processes large volumes of source data records to aggregate the data and commit the data to the online OLAP database. FIG. 2 also shows that the online data centers operate in a real-time mode in which the online OLAP database is updated as new data records arrive at the system from the Web API, indicated by the arrows from the Web API showing master data updates and user activity to the Hadoop Distributed File System of each respective online data center. For example, as a user clicks on links of a mobile application on a mobile computing platform, the mobile application sends data to the OLAP cube that corresponds to the links. The data being sent represents user identification, user geographic location, user position within the application, and the like. The sent data is aggregated immediately into the OLAP cube. The dotted lines in FIG. 2 between the blocks for Distributed Table Synch in the online data centers and the Offline Data Center indicate data transfers from the Offline Data Center to the online data centers to ensure synchronization of the respective databases.

Figure 3:
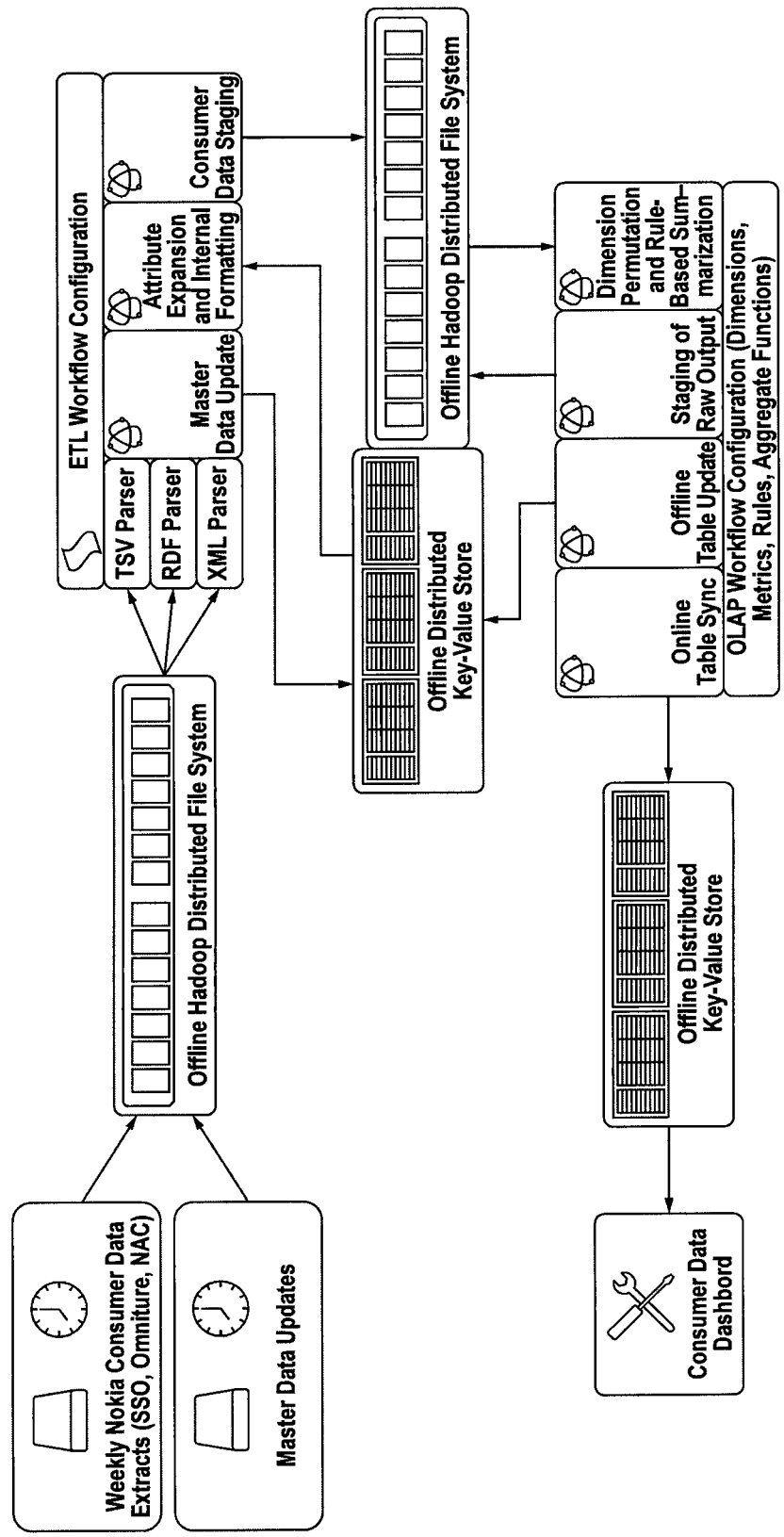
FIG. 3 is a workflow diagram for the system illustrated in FIG. 1.

FIG. 3 illustrates the workflow that occurs in the OLAP system, wherein the FIG. 3 configuration provides a system that utilizes offline background data processing. FIG. 3 shows data updates being received in the upper left corner, to be stored into the Offline Distributed File System. The Distributed File System may be offline, as indicated in FIG. 3, if desired, as only the processed data as described in conjunction with FIG. 1 is required to be online and available for the real-time processing of queries. The parsing, partitioning, and permuting operations (such as described above in conjunction with FIG. 1) are performed in the ETL Workflow Configuration block of FIG. 3, which stores the processed and aggregated data into the Offline Distributed Key-Value Store block and the Offline Hadoop Distributed File System block.

The offline datastores are then subjected to the online data processing, as indicated in the lower right corner of FIG. 3. The online data is then placed in the Online Distributed Key-Value Store, such as indicated in FIG. 1 by the Computer 1 and Computer N blocks. The online datastore is then accessed by a consumer, such as through the read path of FIG. 1.

Exemplary Hardware System

The systems and methods described above may be implemented in a number of ways. One such implementation includes computer devices having various electronic components. For example, components of the system in FIG. 1 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 4:
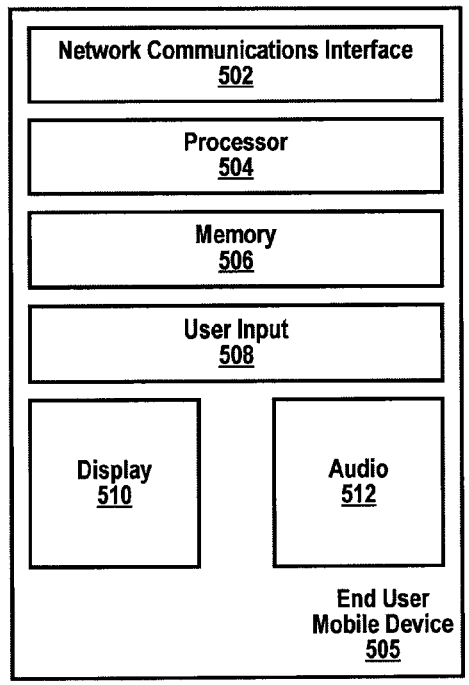
FIG. 4 is a block diagram of an end user mobile device such as used by an end user of the system.

FIG. 4 is a block diagram of a mobile device 500 such as one of the end user devices 108 illustrated in FIG. 1. The mobile device 500 includes a network communications interface 502 through which the mobile device communicates with the partner network 110 or directly with the recommendations system 100 (FIG. 1). A processor 504 controls operations of the mobile device. The processor comprises computer processing circuitry and is typically implemented as one or more integrated circuit chips and associated components. The mobile device includes a memory 506, into which user activity, installed applications, and personal data can be stored. A user input component 508 is the mechanism through which a user can provide controls, responses, and data. The user input component can comprise, for example, a keyboard or numeric pad, voice microphone, touch-sensitive display, or other input mechanism for providing user control and data input. A display 510 provides visual (graphic) output display and an audio component 512 provides audible output for the mobile device.

Figure 5:
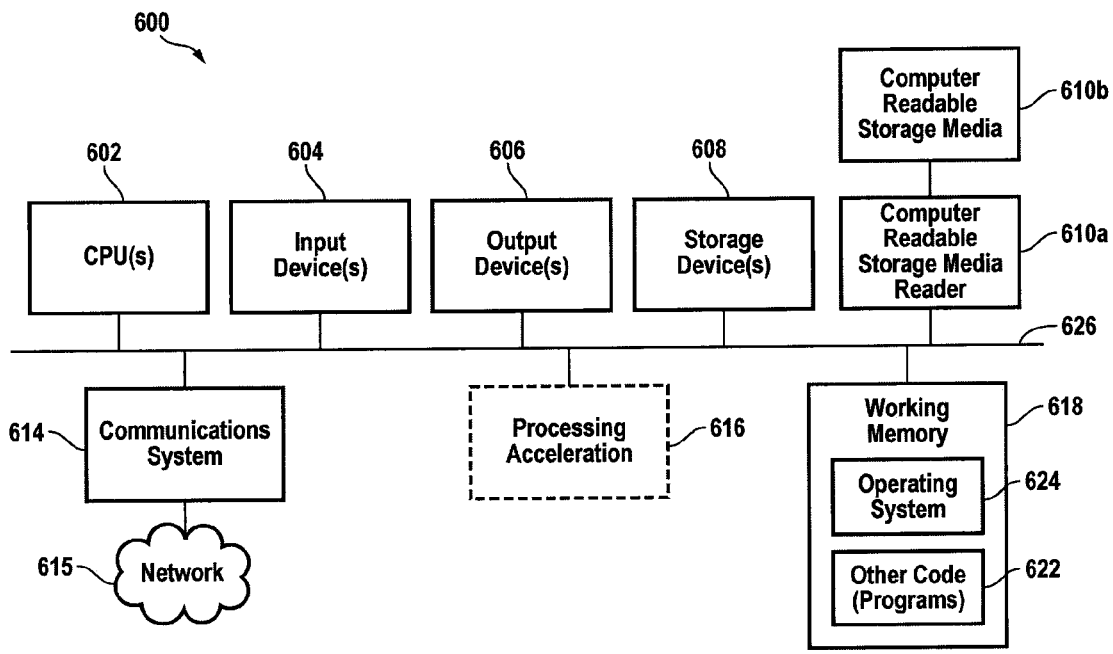
FIG. 5 is a schematic diagram representation of a computer system for implementing functions and operations as described herein.

FIG. 5 provides a block diagram of a computer system 600 for implementing certain functions and operations as described herein. In one embodiment, the system 600 may function as the recommendations system 100 shown in FIG. 1 or a partner network computer 110, or one of the front-end or back-end computers illustrated in FIG. 2 and FIG. 3. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computational system 600 is shown comprising hardware elements that can be electrically coupled via a system bus 626 (or may otherwise be in communication, as appropriate). The hardware elements can include one or more central processor units (CPUs) 602, including without limitation one or more general-purpose processors and/or one or more special-purpose processors (such as communication processing chips, graphics acceleration chips, and/or the like); one or more input devices 604, that can include, without limitation, a mouse, a keyboard, and/or the like; and one or more output devices 606, which can include without limitation a display device, a printer, audio device, and/or the like.

The computational system 600 may further include (and/or be in communication with) one or more storage devices 608, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 600 might also include a communications subsystem 614, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 614 may permit data to be exchanged with a network 615, and/or any other devices described herein. The network 615 may comprise a local area network (LAN) or a network such as the Internet, or a combination. In many embodiments, the computational system 600 will further include a working memory 618, which can include a RAM or ROM device, as described above. The system may optionally include processing acceleration 616 to assist with processing, such as arithmetic computations, graphical computations, and the like.

The computational system 600 also may comprise software elements, shown as being currently located within the working memory 618, including an operating system 624 and/or other code, such as one or more application programs 622, which may comprise computer programs performing tasks and operations described above, and/or may be designed to implement methods in accordance with the invention and/or configure systems in accordance with the invention, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 622. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 610b. In some embodiments, the computer readable storage medium 610b may comprise the storage device(s) 608 described above. In other embodiments, the computer readable storage medium 610b might be incorporated within the computer system. In still other embodiments, the computer readable storage medium 610b might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.), then takes the form of executable code. In these embodiments, the computer readable storage medium 610b may be read by a computer readable storage media reader 610a.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one embodiment, the invention employs local and remote computer systems (such as the computational system 600) to perform methods of the invention. According to a set of embodiments, some or all of the procedures of such methods are performed by the computational system 600 in response to the processor 602 executing one or more sequences of one or more instructions (which might be incorporated into the operating system 624 and/or other code, such as an application program 622) contained in the working memory 618. Such instructions may be read into the working memory 618 from another machine-readable medium, such as one or more of the storage device(s) 608 (or 610). Merely by way of example, execution of the sequences of instructions contained in the working memory 618 might cause the processor(s) 602 to perform one or more procedures of the methods described herein.

The terms "machine readable medium" and "computer readable medium," as used herein, refer to any medium that participates in providing data that causes a machine to operate in a specific fashion. In an embodiment implemented using the computational system 600, various machine-readable media might be involved in providing instructions/code to processor(s) 602 for execution and/or might be used to store and/or carry such instructions/code (e.g., as signals). In many implementations, a computer readable medium is a physical and/or tangible storage medium. Such a medium may take many forms, including but not limited to, volatile and non-volatile media. Non-volatile computer-readable media includes, for example, optical or magnetic disks, such as the storage device(s) (608 or 610). Volatile computer-readable media includes, without limitation, dynamic memory, such as the working memory 618. In some implementation, data may be carried over transmission media. Transmission media includes coaxial cables, copper wire, and fiber optics, including the wires that comprise the bus 626, as well as the various components of the communication subsystem 614 (and/or the media by which the communications subsystem 614 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 602 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 600. These signals, which might be in the form of electromagnetic signals, acoustic signals, optical signals, and/or the like, are all examples of carrier waves on which instructions can be encoded, in accordance with various embodiments of the invention.

The communications subsystem 614 (and/or components thereof) generally will receive the signals, and the bus 626 then might carry the signals (and/or the data, instructions, etc. carried by the signals) to the working memory 618, from which the processor(s) 602 retrieves and executes the instructions. The instructions received by the working memory 618 may optionally be stored on a storage device 608 either before or after execution by the processor(s) 602.

It will be appreciated that many processing capabilities in addition to those described are possible, without departing from the teachings according to the invention. Further, it should be noted that the methods, systems, and devices discussed above are intended merely to be examples. Various embodiments may omit, substitute, or add various procedures or components as appropriate. For example, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Further, the headings provided herein are intended merely to aid in the clarity of the descriptions of various embodiments, and should not be construed as limiting the scope of the invention or the functionality of any part of the invention. For example, certain methods or components may be implemented as part of other methods or components, even though they are described under different headings.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Those skilled in the art will understand that the embodiments describe above may be used in any combination with other embodiments described herein or in combination with devices outside of this disclosure without departing from the invention. For example, any of the cascade assembly embodiments may be employed with any of the mechanisms to translate the cascade assembly, or with the optional scoop embodiment. Alternatively, any of the cascade assembly embodiments herein may be employed with an alternative translating mechanism outside of this disclosure without departing from the invention.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of online analytical processing (OLAP) of a computer system, the method comprising:

enriching a data record read from a source database of the computer system by a computer processor with one or more enriched data fields comprising data read from a reference database by the computer processor, wherein the data record includes multiple data fields, such that the enriched data record includes one or more of the multiple data fields of the data record and one or more of the enriched data fields;

partitioning the multiple data fields of the enriched data record into a dimension partition and a metric partition;

permuting the dimension partition and the metric partition of the enriched data record into sub-dimension projections that are mapped to a plurality of storage keys, such that each of the storage keys includes one or more placeholder wildcard values and each of the storage keys is stored into a database of the computer system by the computer processor;

aggregating the storage keys of a permuted sub-dimension projections onto a two-dimensional coordinate vector such that, if the computer processor identifies a permuted storage key having metric values for which a corresponding storage key already exists in the database, then the computer processor aggregates the metric values of the identified storage key with the metric values of the corresponding storage key, and if the computer processor does not identify the permuted storage key as having a corresponding storage key that already exists in the database, then the computer processor writes the metric values of the permuted storage key into the database, comprising initial values for the key combination of dimension values.

2. The method as in claim 1, further comprising:
storing a plurality of the aggregated storage keys across two or more host computer processors, such that the stored aggregated storage keys comprise a distributed associative array.

3. The method as in claim 1, further comprising:
storing the aggregated storage keys of the permuted sub-dimension projection on a persistent medium of the computer processor; and
storing the aggregated storage keys of the permuted sub-dimension projection in cache memory of the computer processor.

4. A computer system for online analytical processing (OLAP) of event stream data, the computer system comprising:
a network communications block adapted for communications by the computer system with a computer network;
a computer processor configured to execute program instructions for
enriching a data record read from a source database of the computer system by the computer processor with one or more enriched data fields comprising data read from a reference database by the computer processor, wherein the data record includes multiple data fields, such that the enriched data record includes one or more of the multiple data fields of the data record and one or more of the enriched data fields,
partitioning the multiple data fields of the enriched data record into a dimension partition and a metric partition,
permuting the dimension partition and the metric partition of the enriched data record into sub-dimension projections that are mapped to a plurality of storage keys, such that each of the storage keys includes one or more placeholder wildcard values and each of the storage keys is stored into a database of the computer system by the computer processor, and
aggregating the storage keys of a permuted sub-dimension projections onto a two-dimensional coordinate vector such that, if the computer processor identifies a permuted storage key having metric values for which a corresponding storage key already exists in the database, then the computer processor aggregates the metric values of the identified storage key with the metric values of the corresponding storage key, and if the computer processor does not identify the permuted storage key as having a corresponding storage key that already exists in the database, then the computer processor writes the metric values of the permuted storage key into the database, comprising initial values for the key combination of dimension values.

5. The computer system as in claim 4, wherein the computer processor is further configured to execute program instructions for storing a plurality of the aggregated storage keys across two or more host computer processors, such that the stored aggregated storage keys comprise a distributed associative array.

6. The computer system as in claim 4, wherein the computer processor is further configured to execute program instructions for storing the aggregated storage keys of the permuted sub-dimension projection on a persistent medium of the computer processor, and for storing the aggregated storage keys of the permuted sub-dimension projection in cache memory of the computer processor.

* * * * *